United States Patent [19]

Loemker et al.

[11] Patent Number: 5,705,245
[45] Date of Patent: Jan. 6, 1998

[54] COMPOSITE LABEL WEB

[75] Inventors: Thomas R. Loemker, Fairfield, Conn.;
Paul H. Hamisch, Jr., Franklin, Ohio;
Donald L. Karn, Springboro, Ohio;
Rudolph J. Klein, Centerville, Ohio

[73] Assignee: Monarch Marking Systems, Inc., Dayton, Ohio

[21] Appl. No.: 681,569

[22] Filed: Jul. 29, 1996

[51] Int. Cl.$^6$ .............. B32B 3/10; B32B 3/16; B32B 7/06
[52] U.S. Cl. .............. 428/42.3; 428/136; 283/81
[58] Field of Search .............. 428/42.3, 136, 428/906; 283/81

[56] References Cited

U.S. PATENT DOCUMENTS

| | | | |
|---|---|---|---|
| 3,611,929 | 10/1971 | Schrotz | 101/292 |
| 3,783,083 | 1/1974 | Jenkins | 428/40 |
| 4,094,438 | 6/1978 | Neubauer | 221/1 |
| 4,116,747 | 9/1978 | Hamisch, Jr. | 428/40 |
| 4,260,656 | 4/1981 | Mullen | 428/40 |
| 4,393,107 | 7/1983 | Jenkins | 428/42.3 |
| 4,454,180 | 6/1984 | La Mers | 428/42.3 |

*Primary Examiner*—Alexander Thomas
*Attorney, Agent, or Firm*—Joseph J. Grass

[57] ABSTRACT

There is disclosed a composite label web having feed apertures in its carrier web which enable the composite label web to be advanced in a labeler. The feed apertures are preferably arranged in pairs, and each pair has two equally and oppositely transversely and longitudinally inclined feed faces. The feed faces are engageable by a toothed driver. The feed apertures are spaced from the side edges of the carrier web and are spaced apart to avoid tearing out between the feed apertures. Flap portions of the carrier web resulting from making the feed apertures extend in other than the leading direction. The feed faces assist in keeping the carrier web transversely centered in the labeler.

6 Claims, 4 Drawing Sheets

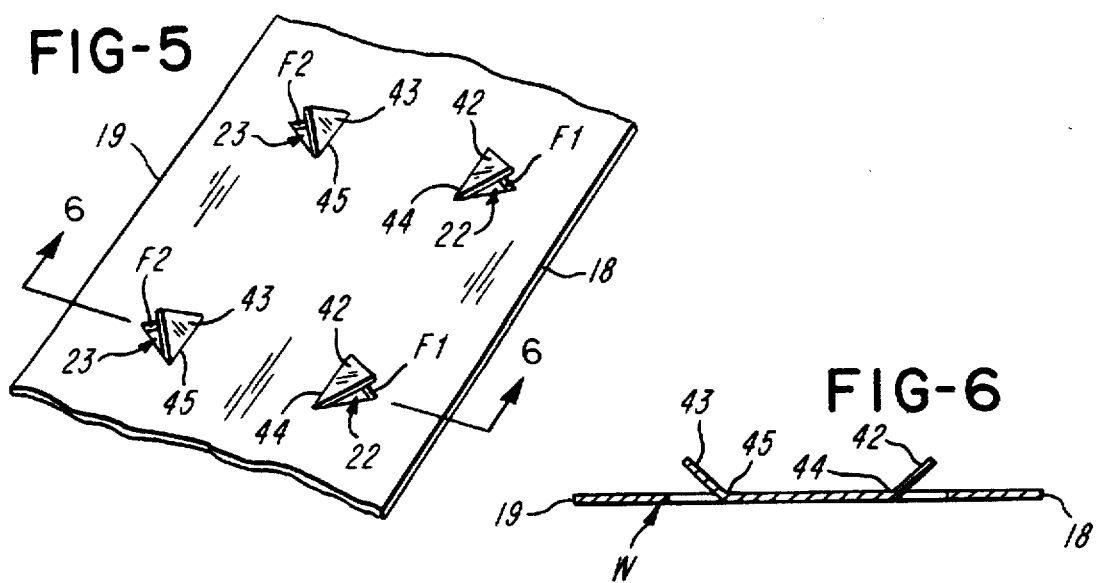
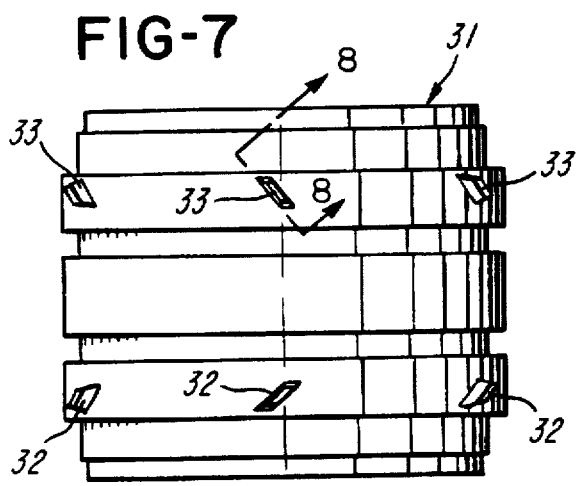
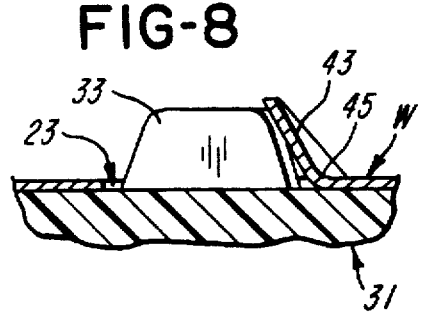
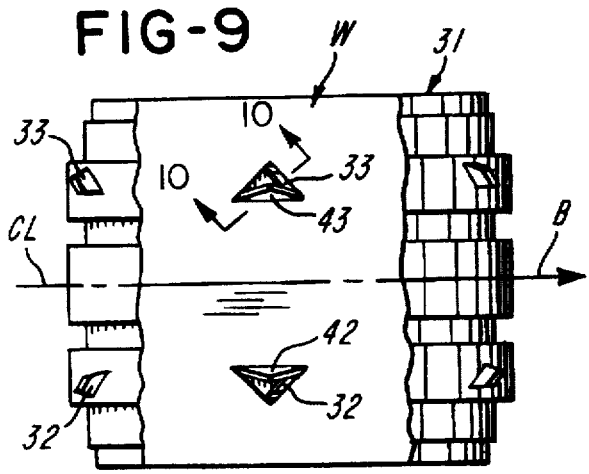
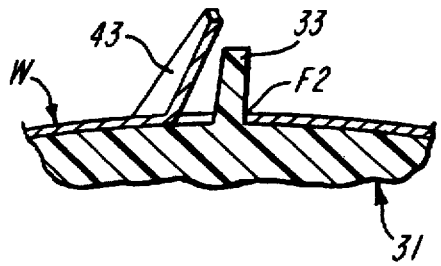

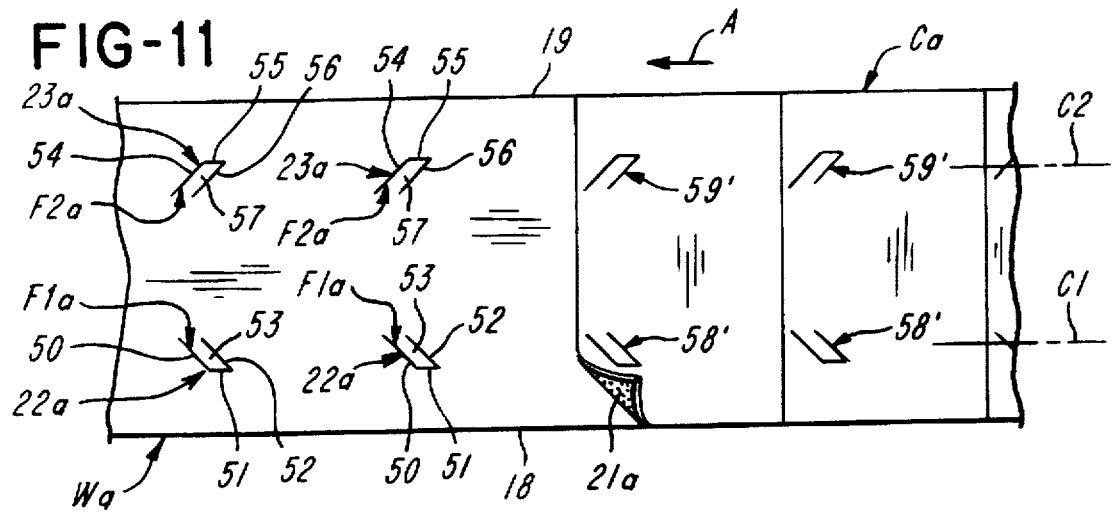
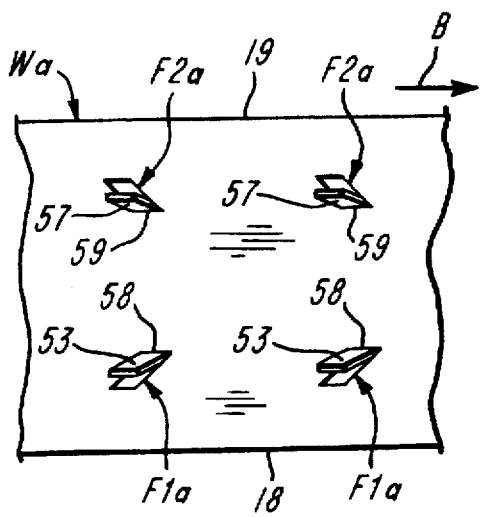
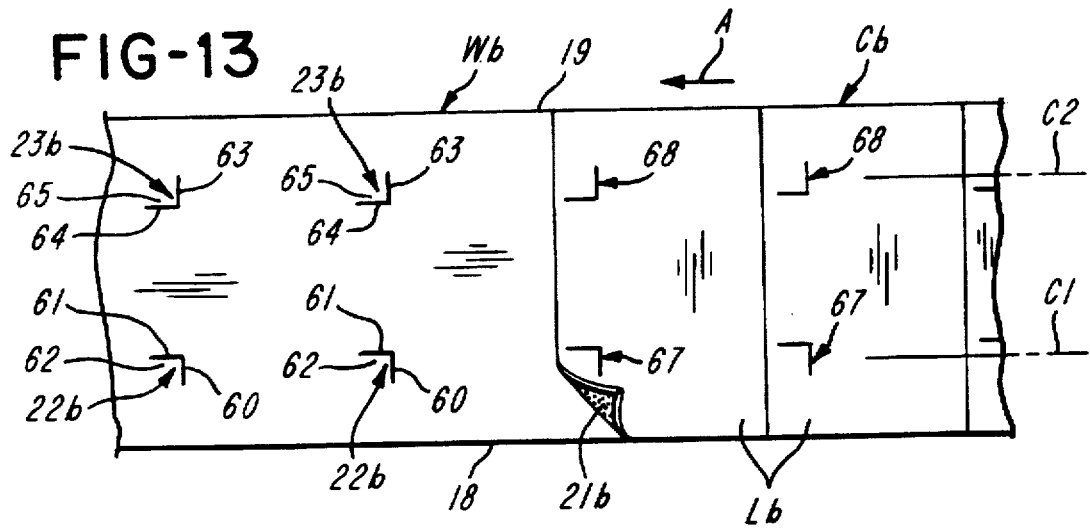

COMPOSITE LABEL WEB

BACKGROUND OF THE INVENTION

1. Field of the Invention

This invention relates to the labeling art.

2. Brief Description of the Prior Art

The following U.S. Patents are made of record: U.S. Pat. No. 3,611,929 to K. Schrotz; U.S. Pat. No. 3,783,083 to W. Jenkins; U.S. Pat. No. 4,094,438 to G. Neubauer; U.S. Pat. No. 4,116,747 to P. Hamisch, Jr.; and U.S. Pat. No. 4,260,656 to J. Mullen. The Mullen patent illustrates, particularly in FIG. 1, the adverse results of tearing of the backing strip or carrier web when the feed apertures are formed by cuts or slits which create flap portions extending in the leading direction. Such flap portions are considered to be leading flap portions. In the Jenkins patent, particularly in the embodiment of FIGS. 28 and 29, the cuts or slits result in flap portions which extend in the trailing direction, and thus are considered to be trailing flap portions. Whether a flap portion is leading or trailing is dependent upon the relative location of the hinge or line about which the flap portion folds or rotates as a tooth of a toothed driver enters the feed aperture. If any part of a flap portion leads or lies forward of the fold line or hinge in the direction of web travel, then that flap portion is considered to be a leading flap portion. If any part of a flap portion trails or lies behind the fold line or hinge away from the direction of web travel, then that flap portion is a trailing flap portion. If no part of a web portion either leads or trails with respect to the fold line or hinge, then such a flap portion is considered to be "neutral". In the embodiment of FIGS. 1 through 9 for example, in the Jenkins patent, backing strip 32 has two neutral flaps or flap portions 59 and 59'. Both a neutral flap portion and a trailing flap portion are considered to extend in other than the leading direction.

It is to be noted that none of the preferred embodiments of the present invention requires the provision of a frangible portion to hold the flap portion in the plane of the carrier web until the flap portion is engaged by a feed tooth.

SUMMARY OF THE INVENTION

This invention relates to improvements in the labeling art.

As shown by the prior art, various efforts have been directed to improving the advance of a composite label web in a labeler in a longitudinal or feed direction. In practice, the labeler has various side edge guides or edge guide surfaces used to assist tracking of the composite label web and to prevent transverse or lateral wandering of the composite label web in the labeler. Such composite label webs typically carry labels on which price and/or other data can be printed. Because the cost of the labels is a function of the size of the labels, it is important that the size of the labels be only large enough to accept the maximum amount of data that can be printed by the labeler. Proper tracking is important because the data must be registered with the label. Longitudinal and transverse registration are important because all of the data to be printed must fit between edges of the label. Longitudinal and transverse registration is very important on labels which carry preprinted information such as the store name because the data printed by the labeler should not overlap the preprinted information. Side edge guides or guide surfaces increase the drag on the web. Such drag must be overcome in order to advance the web through the labeler. In addition, the edge guides or guide surfaces tend to accumulate adhesive and other debris during continued use which further increases the drag, and sluggish operation and/or jamming of the labeler can result.

According to the invention, the improved composite label web has transversely spaced feed apertures spaced from the side edges of the carrier web at spaced intervals along the carrier web, and these feed apertures are not only engaged by a toothed driver to advance the carrier web in the feed direction, but more particularly the feed apertures have feed faces that help center the carrier web to promote tracking of the carrier web along a feed path through the labeler.

In accordance with a specific embodiment of the invention, there is provided a composite label web including a longitudinally extending carrier web to which labels are releasably adhered by pressure sensitive adhesive. There are feed apertures in the carrier web arranged preferably in transversely spaced pairs. There is a predetermined relationship of the feed apertures to the labels so that when the carrier web is advanced by a toothed driver engaged in one or more pairs of feed apertures, the labels are registered at a printing position between a print head and platen. The feed apertures are constructed and arranged to help maintain the carrier web centered in the feed path of the labeler as the carrier web is advanced. More particularly, the feed apertures have feed faces engageable by a toothed driver. The feed faces of each pair are equally but differently inclined transversely and longitudinally toward opposite side edges of the web so that the biasing forces on the feed faces tend to center the advancing carrier web transversely and feed the web longitudinally. A feed face can be comprised of either a cut edge or of a folded edge.

It is a feature of the invention to provide an improved composite label web for use in marking machines of various types, such as mechanical and electronic labelers, machines that print and dispense labels, or that simply apply labels, or that both print and apply labels.

It is another feature of the invention to provide an improved composite label web which is easy to manufacture and low in cost and which has feed apertures for advancing and registering the labels longitudinally with respect to the print head, and which tends to center the composite label web and its carrier web transversely in the labeler feed path, and in which the integrity of the carrier web is maintained to a large extent. The integrity of the carrier web can, for example, be diminished in the event the carrier web has feed apertures with a leading flap portion or in designs which require the feed tooth to tear a frangible portion in the carrier web.

The use of the feed apertures themselves to guide the carrier web allows label webs of different widths to be printed and/or dispensed through the labeler. The use of stationary edge guides would prevent the use of the labeler with label webs of greater width.

3

FIG. 5 is a perspective view showing flap portions which were folded out of the plane of the carrier web by the toothed driver;

FIG. 6 is a sectional view taken generally along line 6—6 of FIG. 5.

Figure 1:
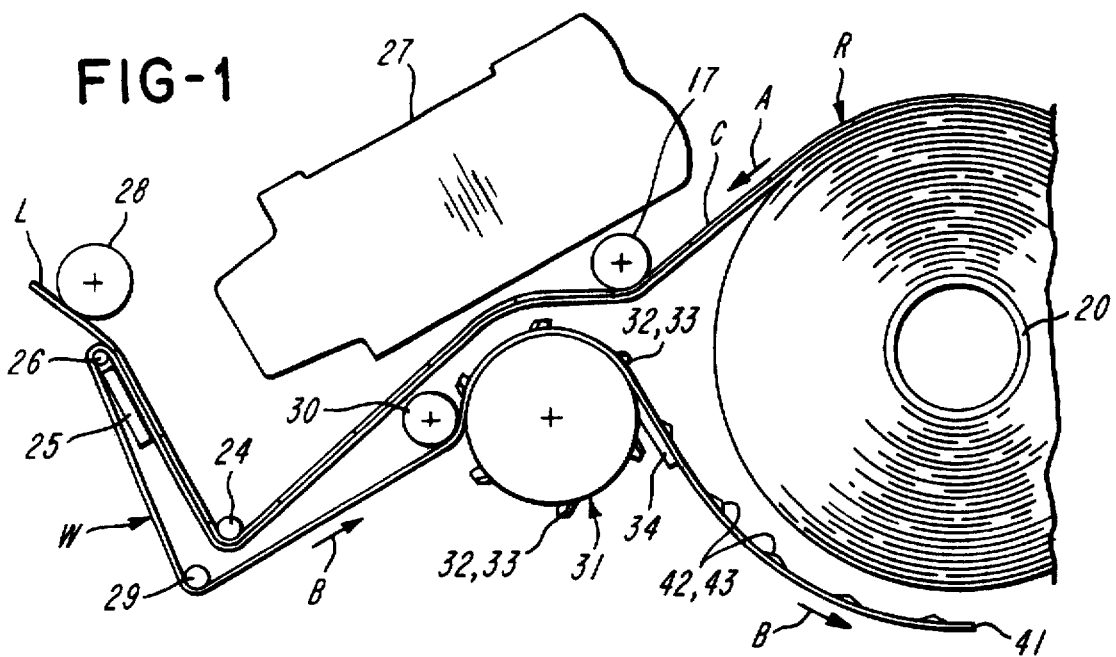
FIG. 1 is a diagrammatic side elevational view of a feed path for a composite label web in accordance with the invention.
Figure 14:
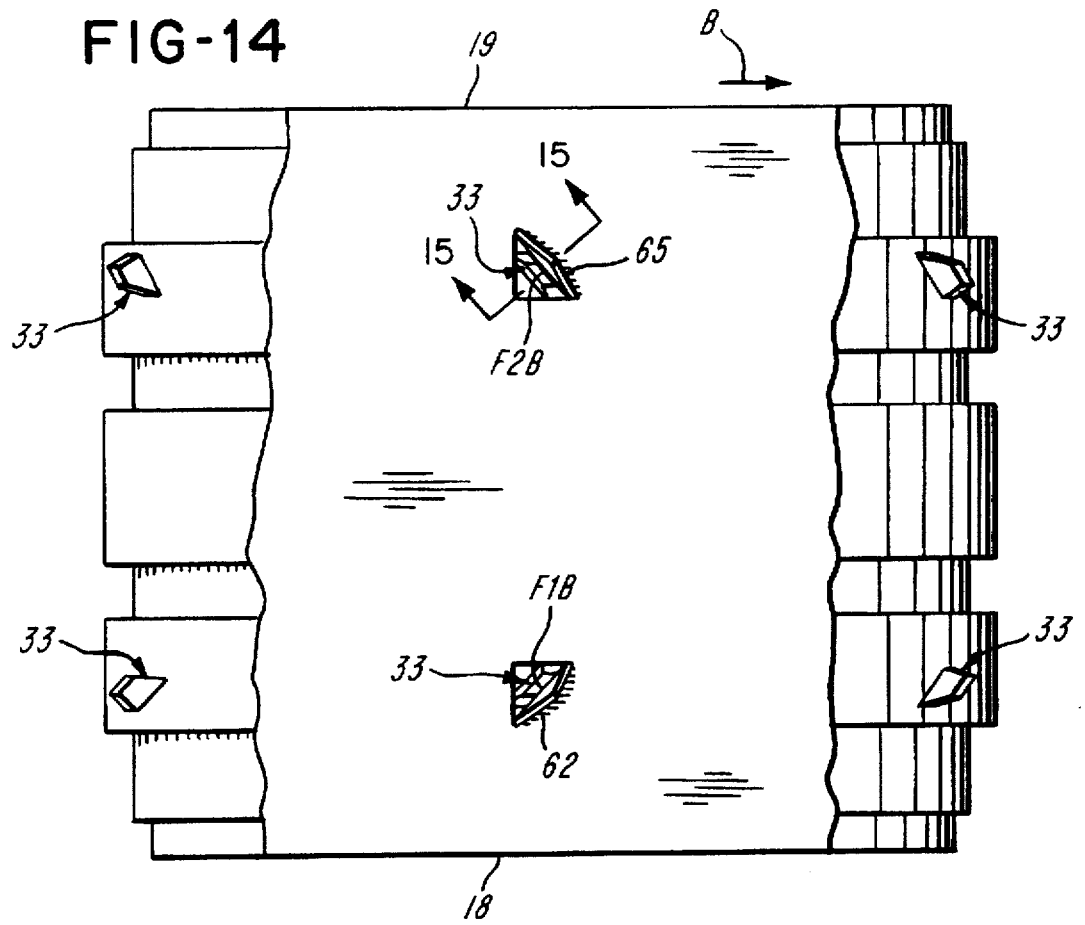
Figure 15:
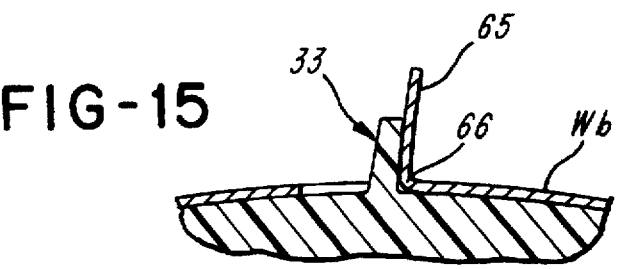

FIG. 7 is a top plan view of a toothed driver also illustrated in FIG. 1;

FIG. 8 is a sectional view taken along line 8—8 of FIG. 7, and additionally showing the carrier web;

FIG. 9 is an enlarged top plan view of the toothed driver and a fragmentary portion of the carrier web engaged with the toothed driver;

FIG. 10 is an enlarged sectional view taken generally along line 10—10 of FIG. 9;

FIG. 11 is a top plan view of a composite label web in accordance with another embodiment of the invention with labels broken away to show the carrier web;

FIG. 12 is a perspective view of the carrier web illustrated in FIG. 11 showing flap portions as having been folded out of the plane of the carrier web by the toothed driver;

FIG. 13 is a top plan view of a composite label web in accordance with yet another embodiment of the invention with labels broken away to show the carrier web; and FIG. 14 is a perspective view of the carrier web illustrated in FIG. 13 showing flap portions as having been folded out of the plane of the carrier web by the toothed driver; and FIG. 15 is a sectional view taken along line 15—15 of FIG. 14.

DETAILED DESCRIPTION OF THE PREFERRED EMBODIMENTS

Figure 2:
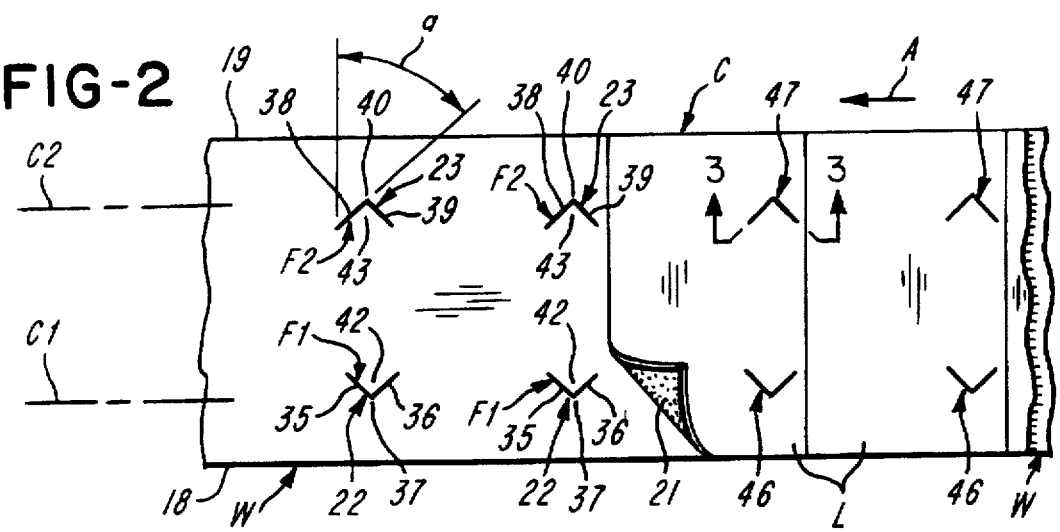
FIG. 2 is a top plan view of the composite label web in accordance with one embodiment of the invention with labels broken away to show the carrier web.

With reference to FIGS. 1 and 2, there is shown a roll R comprised of composite label web C. The roll R is shown to have a central core 20 onto which the composite label web C is wound. Alternatively, the composite label web C can simply be wound upon itself and as such the roll R would be considered to be coreless.

As best shown in FIG. 2, the composite label web C includes a longitudinally extending carrier web W to which a series of labels L are releasably adhered by pressure sensitive adhesive 21 on the undersides of the labels L. The carrier web W has a standard release coating. The carrier web W has feed apertures generally indicated at 22 and 23 disposed in predetermined relationship to the labels L.

The composite label web C is shown diagrammatically in FIG. 1 as being trained along a labeler feed path used in a labeler of the general type shown in U.S Pat. No. 4,116,747. The composite label web C passes from the roll R in a composite web feed direction as indicated by arrow A to below a brake roll 17, partially about a roller 24, over a platen 25 and to a delaminator 26. A print head 27 is cooperable with the platen 25 at a printing station or position with which labels L are successively registered. Transverse registration is especially important when the data is printed in one or more lines transversely across the web between its side edges 18 and 19 as in the illustrated embodiments. Although the print head 27 is used to print prices on the labels, there can be broad use in other applications such as inventory control, quality control, pick and pack operations, hospital control systems, and so forth.

As the carrier web W makes a sharp bend about the delaminator 26, the leading label L is delaminated and is disposed at a position in underlying relationship to an applicator 28 shown to be in the form of a roll. The carrier

4 web W passes in direction of arrow B away from the delaminator 26 to and partially about a roller 29. From there the carrier web W passes in the direction of arrow B to between the nip of a grooved die roller 30 and a toothed driver 31 shown to be in the form of a rotary feed wheel. The driver 31 can have closely spaced peripheral ridges but this is not part of the present invention. The driver 31 has teeth 32 and 33 engageable with the respective feed apertures 22 and 23. A deflector 34 deflects the carrier web W from the toothed driver 31 and from there the carrier web W exits the labeler feed path along an exit chute (not shown) in the direction of arrow B.

Figure 4:
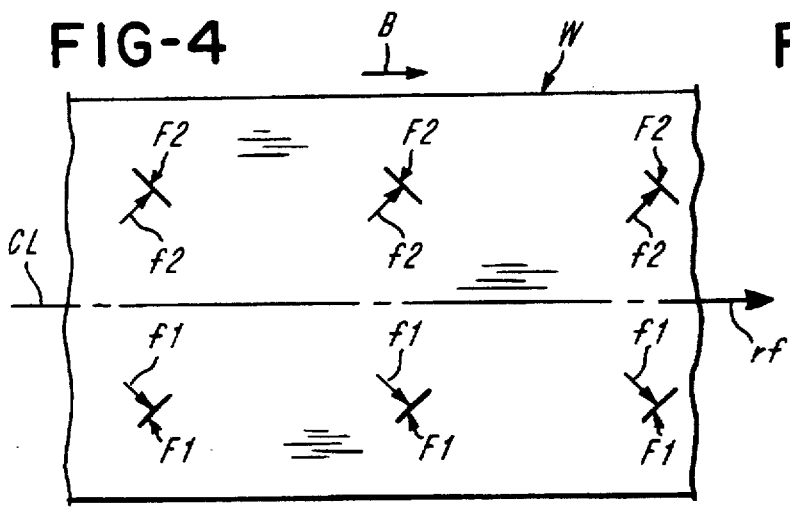
FIG. 4 is a simplified fragmentary diagrammatic view illustrating only feed faces and the forces exerted on and resisted by the feed faces during advance of the carrier web.
Figure 3:
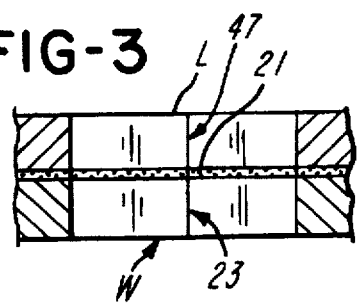
FIG. 3 is an enlarged sectional view taken at 3—3 generally along an angled cut which provides a feed aperture.

With reference to FIG. 2, the composite label web C is shown in roughly the same orientation as in FIG. 1, traveling in the direction of arrow A, namely, toward the delaminator 26. The feed apertures 22 are disposed in one longitudinally extending column C1 and the feed apertures 23 are disposed in another longitudinally extending column C2. The columns C1 and C2 are transversely or laterally spaced as shown. The feed apertures 22 and 23 are positioned between and spaced from opposite side edges 18 and 19 of the carrier web W. The apertures 22 and 23 are preferably arranged in transversely spaced pairs. The patterns of the embodiment of FIGS. 1 through 3, 5, 6 and 8 through 10 is shown for example in FIG. 2, wherein the cuts 22 and 23 are in oppositely extending V-shaped patterns. The feed apertures 22 include knife cuts or slits 35 and 36 extending preferably through the carrier web W and which preferably meet at a vertex 37. The feed apertures 23 include knife cuts or slits 38 and 39 extending preferably through the carrier web W and which preferably meet at a vertex 40. The vertices 37 and 40 are shown to be transversely aligned, the cuts 35 and 38 are shown to be transversely positioned with respect to each other, and the cuts 36 and 39 are shown to be transversely positioned with respect to each other. The cuts 35 and 38 define feed faces F1 and F2 against which the respective teeth 32 and 33 engage. The feed faces F1 and F2 defined by the cuts 35 and 38 are inclined or biased transversely and longitudinally. The cuts 35 extend transversely in one direction with respect to outer free end 41 (FIG. 1) of the composite label web C and, indeed, of the carrier web W, and the cuts 38 extend transversely in a different direction with respect the outer free end 41 of the composite label web C and, indeed, of the carrier web W. It is preferred that the inclinations or bias of the feed faces F1 and F2 be equal. The feed faces F1 are inclined toward the side edge 18 and feed faces F2 are preferably equally inclined toward the opposite side edge 19. FIG. 4 shows a simplified view of only the feed faces F1 and F2 of the carrier web W showing the direction in which the teeth 32 and 33 exert driving forces f1 and f2 on the feed faces F1 and F2. The preferably equal and opposite transverse vectors or components of the forces f1 and f2 move or bias the web W to the center line CL of the feed path until these forces balance each other, and the remaining forces rf advance the carrier web W in the direction of arrow B.

The cuts 36 and 39 are provided so that the teeth 32 and 33 of the toothed driver 31 easily enter the respective feed apertures 22 and 23. The two joined cuts 35 and 36 form a flap portion 42 and the two joined cuts 38 and 39 form a flap portion 43. The flap portions 42 and 43 are neutral flap portions because they extend neither in the leading direction nor in the trailing direction. The flap portions 42 and 43 of the carrier web W are initially in the plane of the carrier web W. However, when the flap portions 42 and 43 are contacted by the respective teeth 32 and 33, the flap portions 42 and 43 are folded out of the plane of the carrier web W at respective fold lines 44 and 45 as best shown in FIG. 5 and 6. Because the leading edges of the flap portions 42 and 43 formed by respective cuts 35 and 38 are inclined, the flap portions 42 and 43 are cammed back toward the plane of the carrier web W as the flap portions 42 and 43 pass through the exit chute. This helps prevent the flap portions 42 and 43 from being caught in the exit chute.

Also shown in FIG. 2 are cuts 46 and 47 in a V-shaped pattern in the labels L. The cuts 46 and 47 are aligned with cuts 35 and 36 and cuts 39 and 40 in the carrier web W. The cuts 46 and 47 are preferably entirely through the labels L and render the labels more difficult to remove when they have been applied to merchandise, thereby making label switching more difficult.

In devising composite label webs for labelers, the composite label web is devised first, and then the toothed driver is devised in the proper arrangement to feed the composite label web C with the least number of problems. The toothed driver 31 is shown diagrammatically in FIG. 7. FIG. 8 shows that the tooth 33 is narrower than the length of the feed face F2. FIGS. 9 and 10 show the flap portion 43 as having been folded out of the plane of the carrier web W by one of the teeth 23. The carrier web W is shown centered along the centerline CL of the toothed driver 31.

The feed faces F1 and F2 most preferably extend along lines that are preferably perpendicular to each other. As shown in FIG. 2, the feed faces F2 extend at an angle "a" which is most preferably about 45° with respect to the transverse direction, and consequently at 45° with respect to the longitudinal direction. The angles of each of the feed faces F1 and F2 are preferably equal, however, the feed faces F1 are inclined toward the side edge 18 and the feed faces F2 are inclined toward the side edge 19. The angle "a" is preferably between about 20° and 55°. As shown for example in FIG. 2, the feed cuts 35, 36, 38 and 39 are preferably straight.

It is apparent that the feed faces F1 and F2 are at a leading position with respect to the outer free end 41. The flap portions 42 and 43 extend transversely and extend neither in the leading direction nor in the trailing direction. The flap portions 42 and 43 are neutral. It is preferred that the flap portions 42 and 43 extend in other than the leading direction to prevent tearing of the carrier web W.

In the embodiment of FIGS. 11 and 12, the same reference characters are used for corresponding components, with the addition of the letter "a". The embodiment of FIGS. 11 and 12 is the same as the embodiment of FIGS. 1 through 3, 5, 6 and 8 through 10 except as otherwise shown and/or described.

FIGS. 11 and 12 show an alternative embodiment of composite label web Ca traveling in direction A toward the delaminator 26. Feed apertures 22a and 23a exist in the carrier web Wa. The feed apertures 22a include three knife cuts or slits 50, 51 and 52 extending preferably through the carrier web Wa. The cuts 50 and 52 are parallel and are inclined transversely in one direction and also longitudinally. Each cut 50 is joined to one end of the associated cut 51 and the cut 52 is joined to the other end of the associated cut 51. The cuts 51 extend in the longitudinal direction. Each group of cuts 50, 51 and 52 forms a flap portion 53. The feed apertures 23a include three knife cuts or slits 54, 55 and 56 extending preferably through the carrier web Wa. The cuts 54 and 56 are parallel and are inclined transversely equally in a different direction than cuts 50 and 52 and also longitudinally. Each cut 54 is preferably joined to one end of the associated cut 55 and each cut 56 is preferably joined to the other end of the associated cut 55. The feed apertures 22a and 23a preferably extend along the composite web Wa in transversely spaced pairs. The feed cuts 50 and 54 define feed faces F1a and F2a. The preferred and most preferred angles of the feed faces F1a and F2a are like that of the feed faces F1 and F2. The feed faces F1a and F2a defined by the cuts 50 and 54 are equally and differently inclined with respect to opposite side edges 18 and 19. As shown in FIG. 12, the feed teeth 32 and 33 have pushed the flap portions 53 and 57 out of the plane of the carrier web Wa along fold lines 58 and 59. The flap portions 53 and 57 are trailing flap portions because they extend in the trailing direction away from the free end 41 of the composite label web Ca. The labels La have a group of knife cuts 58' and 59' through the labels La which are aligned with the respective groups of cuts 50, 51 and 52, and 54, 55 and 56. The labels La have pressure sensitive adhesive 21a on their undersides.

With reference to the embodiment of FIGS. 13 through 15, the same reference characters are used for corresponding components, with the addition of letter "b". The embodiment of FIGS. 13 through 15 is the same as the embodiment of FIGS. 1 through 3, 5, 6 and 8 through 10 except as otherwise shown and/or described.

FIGS. 13 through 15 show another alternative embodiment of composite label web Cb having labels Lb releasably adhered to the carrier web Wb by pressure sensitive adhesive 21b. Feed apertures 22b and 23b extend through the carrier web Wb. The feed apertures 22b include two joined knife cuts or slits 60 and 61 extending preferably through the carrier web Wb. The cuts 60 extend transversely and the cuts 61 extend longitudinally. The cuts 60 and 61 are shown to be perpendicular and form a flap portion 62. The feed apertures 23b include two joined knife cuts or slits 63 and 64 extending preferably through the carrier web Wb. The cuts 63 extend transversely and the cuts 61 extend longitudinally. The cuts 63 and 64 are shown to be perpendicular and form a flap portion 65. The flap portions 62 and 65 are trailing flap portions because they extend in the trailing direction away from the free end 41 of the composite label web Cb. When engaged by teeth 32 and 33 of the toothed driver 31, the flap portions 62 and 65 are folded out of the plane of the carrier web Wb as best shown in FIG. 14 and feed faces F1b and F2b are provided by the folded edges 66 where the respective flap portions 62 and 65 are joined to the remainder of the carrier web Wb. The preferred and most preferred angles of the feed faces F1b and F2b are like that of the feed faces F1 and F2. The labels Lb have cuts or slits 67 and 68 therethrough. It is apparent that the feed faces F1b and F2b are inclined or biased transversely equally and in different directions so that the teeth 32 and 33 acting on feed faces F1b and F2b exert forces as depicted in FIG. 4 to advance the carrier web Wb in the direction of arrow B. Thus, it is apparent that the invention is applicable to advance a carrier web at folded feed edges as in the embodiment of FIGS. 13 through 15, or at cut feed edges as in the embodiment of FIGS. 1 through 3, 5, 6 and 8 through 10 and as in the embodiment of FIGS. 11 and 12.

In all the foregoing embodiments of the invention, the feed apertures 22 and 23, 22a and 23a, 22b and 23b are spaced transversely inwardly from opposite side edges 18 and 19. The carrier webs W, Wa and Wb are also wide enough in the transverse direction to prevent undue web weakening and breakage thereof. The feed faces F1 and F2, F1a and F2a, and F1b and F2b are also spaced widely enough apart in the transverse direction to prevent tearing out of that portion of the web W, Wa or Wb which lies between these transversely spaced feed faces. The columns C1 and C2 are spaced apart widely enough to obviate tearing out between the feed apertures 22 and 23, 22a and 23a, and 22b and 23b.

The carrier webs W, Wa and Wb can have additional knife cuts or slits without departing from the spirit of the invention. For example, if the carrier webs W, Wa and Wb are wide enough and/or are strong enough, then the carrier webs W, Wa and Wb can have additional functional tooth-engageable feed apertures which do not bias the carrier webs W, Wa or Wb transversely such as the I-shaped feed cut pattern of the embodiment of FIGS. 1 through 9 of the Jenkins patent or the Y-shaped feed cut patterns disclosed in the Neubauer patent.

For wider composite label webs, one or more additional pairs of columns of apertures as depicted above can be used.

Other embodiments and modifications of the invention will suggest themselves to those skilled in the art, and all such of these as come within the spirit of this invention are included within its scope as best defined by the appended claims.

We claim:

1. A composite label web for use in a labeler including a feed wheel having pairs of axially spaced and peripherally arranged feed teeth with tooth faces in which one tooth face of each pair is inclined toward one side of the feed wheel and the other tooth face of each pair is inclined toward the other side of the feed wheel for pulling in a leading direction on a carrier web at a location where labels have been delaminated, the composite label web comprising: a longitudinally extending carrier web having side edges, a series of labels releasably adhered to the carrier web by pressure sensitive adhesive on the labels, feed apertures in the carrier web spaced from the side edges, the feed apertures being disposed in two longitudinally extending transversely spaced columns, the feed apertures being transversely aligned in pairs, wherein the feed apertures have inclined feed faces engageable with the inclined tooth faces, wherein the inclination of the feed faces in one column of feed apertures is from 20 degrees to 55 degrees transversely in one direction toward the one side edge and the inclination of the feed faces in the other column of feed apertures is from 20 degrees to 55 degrees transversely in another direction toward the other side edge, wherein the feed faces are so inclined for helping to maintain the carrier web centered transversely during advance of the carrier web by the inclined tooth faces, wherein the feed apertures are formed by cuts which define flap portions, and wherein all the flap portions underlie the labels and extend in other than the leading direction.

2. A composite label web as defined in claim 1, wherein the feed faces are provided by folded edges.

3. A composite label web as defined in claim 1, wherein the feed faces are provided by cut edges.

4. A composite label web as defined in claim 3, wherein the cut edges are straight.

5. A composite label web for use in a labeler including a feed wheel having pairs of axially spaced and peripherally arranged feed teeth with tooth faces in which one tooth face of each pair is inclined toward one side of the feed wheel and the other tooth face of each pair is inclined toward the other side of the feed wheel for pulling in a leading direction on a carrier web at a location where labels have been delaminated, the composite label web comprising: a longitudinally extending carrier web having side edges, a series of labels releasably adhered to the carrier web by pressure sensitive adhesive on the labels, feed apertures in the carrier web spaced from the side edges, the feed apertures being disposed in two longitudinally extending transversely spaced columns, the feed apertures being transversely aligned in pairs, wherein the feed apertures have inclined feed faces engageable with the inclined tooth faces, wherein the inclination of the feed faces in one column of feed apertures is from 30 degrees to 55 degrees transversely in one direction toward the one side edge and the inclination of the feed faces in the other column of feed apertures is from 30 degrees to 55 degrees transversely in another direction toward the other side edge, wherein the feed faces are so inclined for helping to maintain the carrier web centered transversely during advance of the carrier web by the inclined tooth faces, wherein the feed apertures are formed by cuts which define flap portions, and wherein all the flap portions underlie the labels and extend in other than the leading direction.

6. A composite label web for use in a labeler including a feed wheel having pairs of axially spaced and peripherally arranged feed teeth with tooth faces in which one tooth face of each pair is inclined toward one side of the feed wheel and the other tooth face of each pair is inclined toward the other side of the feed wheel for pulling in a leading direction on a carrier web at a location where labels have been delaminated, the composite label web comprising: a longitudinally extending carrier web having side edges, a series of labels releasably adhered to the carrier web by pressure sensitive adhesive on the labels, feed apertures in the carrier web spaced from the side edges, the feed apertures being disposed in two longitudinally extending transversely spaced columns, the feed apertures being transversely aligned in pairs, wherein the feed apertures have inclined feed faces engageable with the inclined tooth faces, wherein the inclination of the feed faces in one column of feed apertures is about 45 degrees transversely in one direction toward the one side edge and the inclination of the feed faces in the other column of feed apertures is about 45 degrees transversely in another direction toward the other side edge, wherein the feed faces are so inclined for helping to maintain the carrier web centered transversely during advance of the carrier web by the inclined tooth faces, wherein the feed apertures are formed by cuts which define flap portions, and wherein all the flap portions underlie the labels and extend in other than the leading direction.

* * * * *